United States Patent [19]
Gartner

[11] 3,756,413
[45] Sept. 4, 1973

[54] METHOD AND APPARATUS FOR MAKING POTABLE WATER

[75] Inventor: William Joseph Gartner, Bartlett, Ill.

[73] Assignee: Gartner Research & Development Co., Bartlett, Ill.

[22] Filed: Apr. 13, 1972

[21] Appl. No.: 243,645

[52] U.S. Cl............... 210/205, 210/220, 210/266, 261/121 R
[51] Int. Cl............................................ B01d 27/02
[58] Field of Search................... 210/205, 221, 266; 222/5, 399

[56] References Cited
UNITED STATES PATENTS
3,327,859  6/1967  Pall.................................. 210/282
3,327,899  6/1967  Reynolds et al........................ 222/5
3,430,769  3/1969  Sanzebacher...................... 210/266

*Primary Examiner*—Samih N. Zaharna
*Assistant Examiner*—Benoit Castel
*Attorney*—Max Dressler et al.

[57] ABSTRACT

Impure water is made suitable for drinking in an apparatus comprising a pressurizable holding tank attached to a purification cartridge containing an impurities adsorbent and a fine filter. A gas-containing cartridge is pierced to provide a bactericidal gas for killing pathogenic microorganisms and for pressurizing the holding tank to force the water through the purification cartridge.

9 Claims, 1 Drawing Figure

PATENTED SEP 4 1973
3,756,413
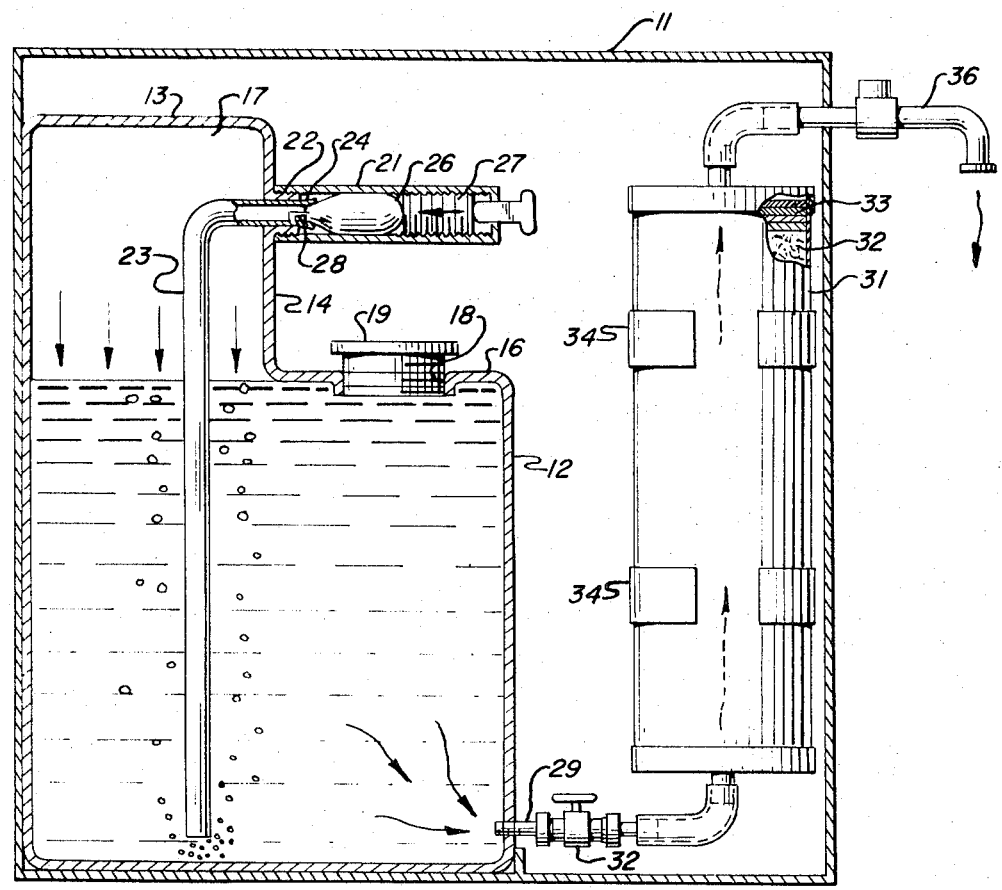

METHOD AND APPARATUS FOR MAKING POTABLE WATER

BRIEF DESCRIPTION OF THE INVENTION

There is a need for a light, compact system capable of converting small quantities of impure water to potable water. Hikers, campers, fishermen and other outdoorsmen are frequently in places where drinking water is unavailable although water of impure quality is present. Soldiers, on maneuvers or in combat, have need for a system for water purification. In lifeboats, a suitable system for converting sea water to potable water may make the difference between survival and non-survival.

For raw water of relatively good purity in which bacterial contamination is the principal problem, there are chemical-containing tablets which may be added to the water to kill the bacteria. Such tablets, however, are ineffective in the removal of many water contaminants such as minerals, suspended particles and odor-containing materials. In fact, such tablets usually add an odor or taste of their own, making the water unpleasant to drink.

In accordance with the present invention, there is provided an apparatus for making potable water from contaminated water comprising a pressurizable holding tank having a water retention space superposed by a gas retention space, an outlet conduit leading from a lower portion of said holding tank to a purification cartridge containing a granular adsorbent, valve means in said conduit means, gas cartridge means containing a gas under pressure, means to puncture said gas cartridge means to release the gas therefrom and conduit means to transfer said released gas to a lower portion of said water retention space.

DETAILED DESCRIPTION OF THE INVENTION

The drawing shows the system of this invention in elevation and partly in section.

The drawing shows outer casing 11 in which the other elements of the system are contained. Outer casing 11 has a hinged front panel (not shown in the drawing) for ready access to the interior elements.

Holding tank 12, molded of polyethylene or other suitable plastic material, is a vessel capable of withstanding internal pressure of the order of about 20 pounds per square inch. The tank has generally rectangular corners and is L-shaped in that its upper wall is of stepped construction and includes upper portion 13, vertical wall 14 and lower portion 16. This construction provides air space 17 below upper portion 13 when the tank is filled with water through opening 18 and to its level. The opening is sealed by stopper 19 which fits tightly in the opening.

Pressurizing cylinder 21 is attached to vertical wall 14 by threaded connection 22, the male portion of which is an integral part of the holding tank molding. Tube 23 extends through threaded connection 22 at its upper end and to a position at its lower end and close to the bottom of the holding tank. Beyond the threaded connection, tube 23 is flared, as shown at 24, to receive the puncturable end of gas capsule 26 and to make a gas tight connection therewith.

Threaded plunger 27 fits into the open end of pressurizing cylinder 21 and, when threaded far enough into the pressurizing cylinder, pushes gas capsule 26 into point 28 to puncture the puncturable end of the capsule and thereby release its contents to pass into and through tube 23 to the bottom of the holding tank and the water contained therein.

Gas capsule 26 contains gas for decontaminating and pressurizing the water. The gas comprises a mixture of nitrous oxide and chlorine, the former predominating. In a specific embodiment, the gas capsule contains 8 grams of gas of which 0.025 grams is chlorine and 7.975 grams in nitrous oxide.

Conduit 29, connected to the lower part of holding tank 12, leads to the lower part of purification cartridge 31 when valve 32 is opened. Cartridge 31, shown partly in section, contains granular adsorbent 32 and fine outlet filter 33, the latter having sufficient resistance to flow to provide substantial back pressure within the filter cartridge when water flows therethrough. Preferably, fine outlet filter 33 is of such fineness as to provide a back pressure from about 5 to about 20 pounds per square inch when water at ambient temperature flows through the cartridge at the rate of 5 gallons per hour per square inch of area of filter 33. Preferably, cartridge 31 also contains a fine inlet filter (not shown) having a resistance to flow at least as great as that of outlet filter 33. A detailed description of a preferred filter cartridge utilizable in this invention is shown in my copending application Ser. No. 243,644, filed concurrently herewith, the disclosure of said application being incorporated herein by reference.

Granular adsorbent 32 may be made of activated carbon when intended to purify water containing gases, or odor or color-forming materials. When the cartridge is intended to treat waters of high mineral content, such as brackish water or sea water, granular adsorbent 32 may be an ion exchange resin, and preferably a mixture of anionic and cationic exchange resins.

It is usually desired to remove from the water most of the chlorine added from the gas cartridge because its taste is unpleasant. In addition, the passage of water through an ion exchange resin tends to impart an unpleasant taste thereto. For these reasons, the granular adsorbent 32 is usually not an ion exchange resin in its entirety. For the adsorption of minerals, it is usually preferred to utilize a cartridge containing one or more ion exchange resins as a principal constituent occupying a major portion of the cartridge space, and also containing a layer of activated carbon at each end of the cartridge to remove chlorine and the unpleasant ion exchange resin taste from the water.

Cartridge 31 is held in place by clamps 34. The effluent from the cartridge is withdrawn through conduit 36 and collected in a suitable clean receptacle for drinking.

In operation, cap 19 is removed, the holding tank is filled with the water to be made potable up to the level of opening 18, and the cap is then firmly replaced. During this period, valve 32 is closed so that the water in the holding tank remains in place. If the water contains visible silt or coarse suspended matter, it may be filtered out by utilizing a funnel and filter when filling the tank through the opening.

Threaded plunger 27 is then removed from the pressurizing cylinder to permit gas cartridge 26 to be placed therein; and the plunger is then replaced. As the plunger continues to be threaded inwardly, it forces the puncturable end of the gas cartridge into point 28, puncturing the cartridge and releasing the gas to flow into and through line 23. The gas emerging from the bottom of line 23 bubbles through the water, so that there is intimate contact between the water and the gas and the chlorine content of the gas can exercise its bactericidal action on the water.

The nitrous oxide content of the gas is the principal pressurizing component thereof and exerts pressure on the water from gas space 17. In a holding tank having a capacity for liquid of about one-half gallon and a gas holding capacity of about 20 cubic inches, the 8 gram gas cartridge provides an initial pressure of about 20 pounds per square inch at a temperature of 75° F.

After the gas cartridge is punctured, valve 32 is permitted to remain closed for a waiting period of about 15 seconds. It is then opened to permit the water to flow upwardly through the purification cartridge. The resistance of the fine filters at the entrance and exit of the filter cartridge limits flow therethrough to a moderate rate, ranging from about 20 gallons per hour at the beginning of the flow when the gas pressure is about 20 psi and gradually reducing to about 3 gallons per hour as the outflow of water expands the gas space and reduces the pressure to about 4 psi.

A test of this invention was made with a deliberately contaminated water made from raw municipal sewage to which salts had been added to bring the minerals content up to a level of 1,000 ppm. One-half gallon of this liquid was treated in the apparatus described above utilizing a purification cartridge in which the granular adsorbent was primarily ion exchange resin, but which contained a layer of activated carbon at each end of the cartridge. The effluent water had less than 20 ppm of dissolved solids and no chlorine. The coliform count was reduced from 4 (on a scale ranging from 0 to 5) to zero, the upper limit for potability being less than 1. The effluent water was fit to drink and had no unpleasant taste, odor or color.

While the invention has been described with respect to a particular modification, it is to be understood that variation may be made without departing from the essence of this invention. The chlorine concentration in the gas mixture in the cartridge may vary, for example, from about 0.1 percent to about 1 percent by volume, depending on how much of a factor of safety is desired to assume the completness of the bactericidal action.

Also, if desired, other gas systems may be used in place of the chlorine-nitrous oxide system described above. Ozone, for example, has both a bactericidal action and a high vapor pressure and may be used in the gas capsule.

Other modifications and variations will be apparent to those skilled in the art.

I claim:

1. Apparatus for making potable water from contaminated water comprising a pressurizable holding tank having a water retention space superposed by a gas retention space, an outlet conduit leading from a lower portion of said holding tank to a purification cartridge containing a granular adsorbent, valve means in said outlet conduit, gas cartridge means containing a gas under pressure, means to puncture said gas cartridge means to release the gas therefrom and conduit means communicating with said cartridge and a lower portion of said water retention space to transfer the released gas to said lower portion of said water retention space.

2. The apparatus of claim 1 wherein said purification cartridge is vertically disposed and said outlet is connected to the lower portion of said purification cartridge.

3. The apparatus of claim 2 wherein said purification cartridge has an outlet filter of such fineness as to provide a back pressure within the cartridge from about 5 to about 20 pounds per square inch when water at ambient temperatures flows through the cartridge at the rate of 5 gallons per hour per square inch of area of said outlet filter.

4. The apparatus of claim 3 wherein said purification cartridge has an inlet filter having at least as much flow resistance as said outlet filter.

5. The apparatus of claim 1 wherein said tank is L-shaped and said gas retention space is in the upper portion of the vertical member of the L.

6. The apparatus of claim 1 wherein said granular adsorbent comprises activated carbon as at least the predominant constituent thereof.

7. The apparatus of claim 1 wherein said granular adsorbent comprises at least one ion exchange resin as at least the predominant constituent thereof.

8. The apparatus of claim 1 wherein said gas under pressure comprises a mixture of a major proportion of nitrous oxide and a minor proportion of chlorine.

9. Apparatus for making potable water from contaminated water comprising an L-shaped pressurizable holding tank having a water retention space corresponding to the horizontal member of the L and a gas retention space corresponding to the upper portion of the vertical member of the L, an outlet conduit leading from a lower portion of said holding tank to a lower portion of a vertically disposed purification cartridge containing a granular adsorbent and having an outlet filter valve means in said conduit means, gas cartridge means containing under pressure a mixture of a major proportion of nitrous oxide and a minor proportion of chlorine, means to puncture said gas cartridge, means to release the gas therefrom and conduit means communicating with said cartridge and a lower portion of said water retention space to transfer the released gas to said lower portion of said water retention space.

* * * * *